March 3, 1970 TATSUO FUJII 3,498,198
SINGLE REFLEX CAMERA WITH INTERCHANGEABLE FOCUSSING SCREENS
Filed Feb. 17, 1966 2 Sheets-Sheet 1

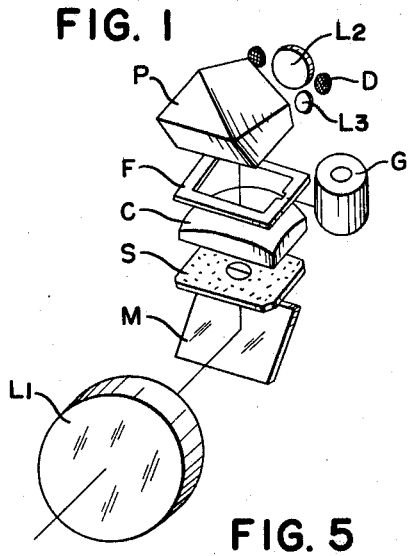

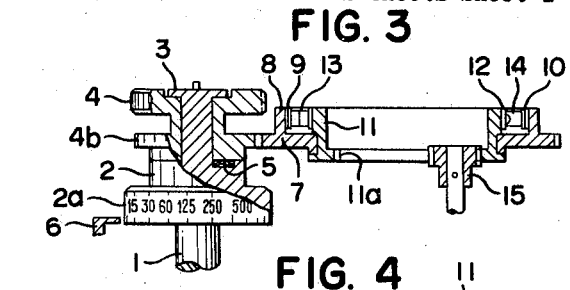

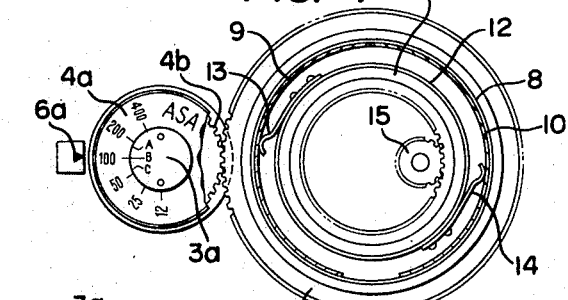

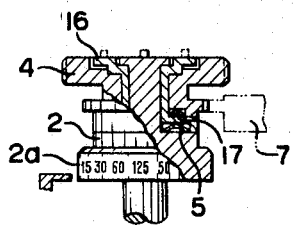

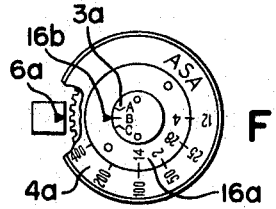

FIG. 2

| Type of the focussing screen | Processed Species | Type of the focussing screen | Processed Species |
|---|---|---|---|
| Split image | Matt surface / Split prism / Matt fresnel surface | Sectioned-&-matted | Matt surface / Matt fresnel surface / Sections |
| Matt | Matt surface / Matt fresnel surface | Microprism-&-matt | Microprism / Matt fresnel surface |
| Cross-line | Transparent glass / Cross-line / Matt surface | Microprism-&-permeable | Microprism / Fresnel surface |
| All-matt | Matt surface | All-microprism | Microprism / Fresnel surface |

INVENTOR.
TATSUO FUJII
BY
ATTORNEY

March 3, 1970     TATSUO FUJII     3,498,198
SINGLE REFLEX CAMERA WITH INTERCHANGEABLE FOCUSSING SCREENS
Filed Feb. 17, 1966     2 Sheets-Sheet 2
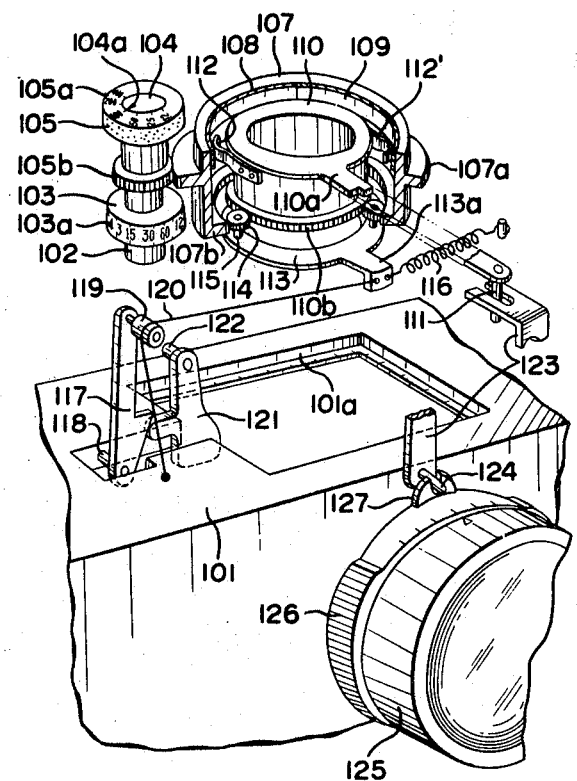
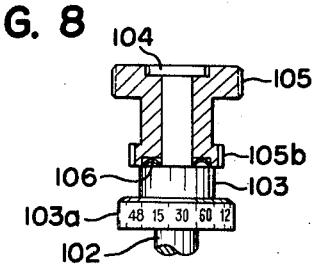
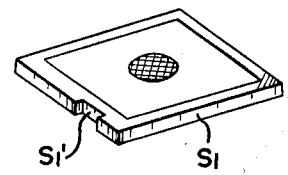
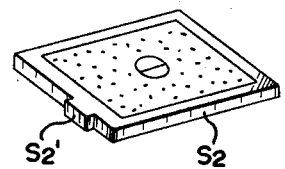
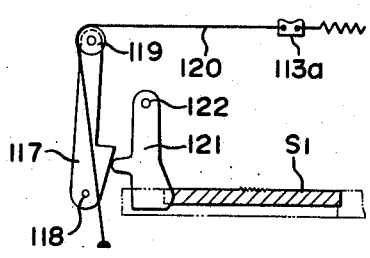
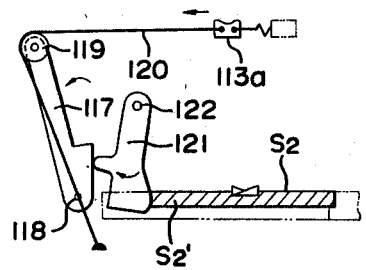
INVENTOR.
TATSUO FUJII
BY
ATTORNEY

United States Patent Office
3,498,198
Patented Mar. 3, 1970

3,498,198
SINGLE REFLEX CAMERA WITH INTERCHANGE-ABLE FOCUSSING SCREENS
Tatsuo Fujii, Tokyo, Japan, assignor to Nippon Kogaku K.K., Tokyo, Japan, a corporation of Japan
Filed Feb. 17, 1966, Ser. No. 528,032
Claims priority, application Japan, Feb. 18, 1965, 40/9,309; Feb. 24, 1965, 40/10,591
Int. Cl. G03b *19/12;* G01j *1/56*
U.S. Cl. 95—42                        4 Claims

ABSTRACT OF THE DISCLOSURE

A single lens reflex camera having interchangeable focussing screens and provided with a compensatory mechanism to correct for the light transmissive characteristics of the various focussing screens used. Compensations are made in the resistance value of a variable resistor in the exposure meter circuit through an adjusting device positionable in accordance with the light transmissive characteristics of the particular screen used. Each focussing screen has a signal abutment thereon which is positioned on one edge of the screen in accordance with the light transmissive characteristics of the screen. The signal abutment of the focussing screen being used engages a portion of the adjusting device to cause a change in the value of the resistance of the exposure meter circuit through the variable resistor.

---

The present invention relates to an improvement in exposure meters provided in single lens reflex cameras which determine suitable exposure time for the object to be photographed by measuring luminance of the focussing screen surface.

These days photographic accessories for example of interchangeable lenses and other means being made readily accessible, so that the application of photographic cameras has been extended to more fields among more people and the current situation is such that requirements are general that any part of the camera should be freely selected and used according to users' own level of photographic skill, their photographic purpose, their personal preference, and so on. Particularly in the production of single lens reflex cameras, in which the focussing operation is an important operation, a significant contribution has been made to the fabrication of focussing screens being used for such cameras. The interchange of the focussing screen is very often made with a view to the particular object to be photographed, the purpose of the photographer, and the interlocking to other devices. However, with exposure meters which measure the brightness of the focussing screen surface, the characteristics of the focussing screen, for example, roughness and fineness of the mat surface of the focussing screen itself, the presence or absence of a range-finding prism or reference lines, and so on, have much to do with the results of measurement.

One of the objects of the present invention resides in the compensation for erroneous measurements originating from interchange of focussing screens, each of which has a specific characteristic.

Another object of the invention resides in the automatic compensation for erroneous measurements originating from interchange of the focussing screen by interlocking the operation of the focussing screen interchange with the camera mechanism.

The characteristic features and advantages of the present invention will be apparent from the following description of the invention made in conjunction with the attached drawing, in which:

FIGURE 1 is a perspective view, showing a general optical arrangement of such exposure meter which measures luminance on the focussing surface by placing the incident light receiving elements of the exposure meter behind the focussing screen surface;

FIGURE 2 illustrates general kinds of focussing screens;

FIGURES 3 and 4 illustrate a major part of a first embodiment of the invention, the former being a sectional view and the latter a plan view;

FIGURES 5 and 6 illustrate a major part of a second embodiment of the invention, the former being a sectional view and the latter a plan view;

FIGURES 7 to 10 illustrates a third embodiment of the invention, FIGURE 7 being a perspective view of the major part thereof, FIGURE 8 a sectional view of the knob assembly for film sensitivity index, FIGURES 9(A) and (B) perspective views of focussing screens furnished with compensatory signal means, and FIGURES 10(A) and (B) illustrative diagrams, respectively, for the focussing screens of FIGURES 9(A) and (B) as these are set in position.

Referring to FIGURE 1, the objective is designated as $L_1$, the reflecting mirror as M, the focussing screen as S, which is one of the varieties of focussing screens as illustrated in FIGURE 2, the condenser lens as C, the view field frame as F, the pentagonal roof prism as P, the eyepiece as $L_2$, the lens as $L_3$ for directing the light rays incident on S surface to the light receiving element D of the exposure meter and the galvanometer as G.

Referring to FIGURE 3, the shutter time adjusting shaft is designated as 1, which is connected in action to a known shutter speed adjusting mechanism; the adjusting knob designated as 2 is rigidly connected to shutter time adjusting shaft 1, the knob having on the peripheral fringe graduated shutter time scales 2a. A compensatory disc designated as 3 is integrally formed with adjusting knob 2 and has on the top a graduated scale 3a, each division thereof designating a selected focussing screen. With respect to the scale 3a, it should be noted that each division or graduation thereon has been predetermined on the basis of the particular characteristics of the focussing screens provided and their correlation that the differential between screens with the characteristics of one used as a reference may be electrically compensated in the exposure meter circuit.

A film sensitivity index or film speed ring 4 is axially and rotatably borne on adjusting knob 2, and has on the top a graduated film sensitivity scale 4a and peripherally a gear 4b. The angular spacing for these scales 4a being in accord with those for said graduated shutter time scales 2a. The pressure plate 5 offers a prescribed resistance to the rotation of film sensitivity index ring 4, so that the ring 4 is rotated when adjusting knob 2 is rotated, whilst ring 4 may be independently rotated from the knob.

The indicator 6 is rigidly fixed to the camera body and has an indicator 6a against which the value of the shutter speed is set.

A ring gear 7 engages with the gear 4b referred to above, and on its periphery has an insulation strip 8. The resistor 9 and the conductor 10, respectively are provided on inner surface of the insulation strip 8 and are electrically connected to each other. An annular terminal 11, having a gear 11a at its lower end, is fitted rotatably within the ring gear 7 referred to above. An insulation strip 12 is cemented on the annular terminal 11, and flexible contact arms 13 and 14, rigidly fixed to the annular terminal 11 though insulated therefrom through the insulation 12, are pressed into contact with the resistor 9 and the conductor 10, respectively. The two contact arms 13 and 14 are connected into the exposure meter circuit as will be described. A gear 15 is connected to the mechanism for altering the diaphragm aperture of the objective lens, and engages with the gear 11a.

The structural arrangement being as such, when the focussing screen S is interchanged, the particular scale of the selected focussing screen, for example B, is aligned with that of the selected film sensitivity index, for example ASA 100, by rotating film sensitivity index ring 4 so that the differential from the reference value is compensated by adjusting the relative position of resistor 9 and plate terminal 13. The subsequent operation is the same as the case when the reference focussing screen is used.

FIGURE 5 illustrates the second embodiment of the invention which is capable of compensating for relative aperture differential of objective for photographic cameras having an interchange of objectives. Referring to the figure, the relative aperture index ring 16 is rotatably mounted on knob 2 and has on the surface relative aperture scales 16a and indicator 16b for focussing screen scales 3a. In this arrangement the film sensitivity index ring 4 is rotatably mounted on the aperture index ring 16, and a pressure plate 17 is provided as a friction lock between the two rings 4 and 16.

It is to be noted that spacings or graduations for relative aperture index scales 16a are determined so that errors in measurement due to differential in maximum relative aperture sizes of objectives may be compensated by the variation of the resistance.

Since the compensatory means for focussing screens is not influenced by the interchange of objective or type of shutter means, the focussing screen may be provided within the path of interlocked shutter means as well as within the path of the interlocked stop or diaphragm.

As herein described, the application of the present inventive device may be able to compensate for errors in exposure measurement ascribable to the interchange of focussing screens.

Next, another form of embodiment of the invention will be described with references being made to FIGURES 7 to 10. The body of a single lens reflex camera is designated as 101; the shutter time adjusting shaft, connected to a known shutter time adjusting mechanism, as 102; the adjusting knob, rigidly fixed to shutter time adjusting shaft 102, as 103; the knob being provided on its peripheral edge with a graduated shutter time scale 103a. An indicator shaft 104 is provided as a fixed extension of the adjusting knob 103, and has a film sensitivity index indicator 104a on its top. The shaft 104 rotatably carries the graduated film sensitivity scale knob 105 having a grad film sensitivity scale 105a, on its upper surface. This knob 105 engages with a calculation gear 107, which is to be later referred to, by means of a gear 105b provided in the lower part of the knob 105. The pressure plate 106 is to give a prescribed friction to knob 105 in rotation so that the knob 105 can be rotated with knob 103 when the latter is rotated and moreover knob 105 may also be independently rotated from the latter. The calculating gear 107 is set in position so as to surround the top of the pentagonal roof prism P previously referred to, and has, on outer and inner peripheral gears 107a and 107b, respectively. The tape resistor 108 and conductor 109, respectively, are applied, through an unillustrated insulation, to the outer peripheral gear 107a, and the resistor and the conductor being electrically connected to each other. The gear-terminal 110 is coaxially rotatable with calculating gear 107 and has a radially extending arm 110a, and in the lower part thereof a gear 110b. A dependent pin 111 is secured in the radial end of the arm 110a. Flexible contacts 112 and 112' secured to the outer periphery of gear-terminal 110 and connected into the exposure meter circuit, are provided to slide respectively over the resistor 108 and the conductor 109. A support ring 113 is coaxially rotatable with the calculating gear 107 and gear-terminal 110, and serves as support for a planetary gear 114, the support having a peripheral projection 113a. The planetary gear 114 engages with gears 107b and 110b, and is rotatably mounted on a pin 115 in support 113. A tension spring 116 urges the support 113 to rotate counterclockwise. It will be apparent that the calculating gear 107, the gear 110b and the planetary gears 114 carried by the support ring 113 form a differential mechanism. An oscillatory lever 117 is pivotably supported at pin 118 which is rigidly fixed to the camera body, the lever having at an extreme end a roller 119, across which is stretched a cord 120 from a fixed point on camera body 101 to another fixed point on said projection 113a. The luminance signal plate 121 is pivotably supported at pin 118 which is rigidly fixed to body and engaged in action with oscillating lever 117. An interlocking plate 123 is provided to transmit to the gear-terminal 110 the stop regulating action for the objective having at its upper end a fork, its upper and fork interlocked with pin 111. The projecting interlocking pin on the plate 123 is designated as 124. The interchangeable lens barrel is designated as 125, the stop setting ring as 126; the stop signal means 127 is rigidly provided on ring 126 to be engaged with pin 124.

FIGURE 9 illustrates two species of focussing screens provided with compensatory signal means, the reference focussing screen being denoted with $S_1$ and the reference luminance signal means being represented by $S'_1$, whilst another selected screen is designated $S_2$ and the particular luminance signal means by $S'_2$. Differentials between focussing screens in luminance exhibited when one and the same objective is used are previously calculated and the compensatory amount for the differential is formulated in the form of the signal means.

Such being the structural design, when a focussing screen S is interchanged, the substituted screen, for example $S_2$, having its proper luminance signal $S'_2$ will push luminance signal plate 121 to displace roller 119 and rotate, through the medium of coupling cord 120, planetary gear support 113, so that the gearing will be actuated and resistor 108 and plate terminal 112 will undergo a change in relative position with the final result that the change in measurement resulting from differential in luminance of the focussing screen is compensated.

It is noted that the present inventive system suffers from no limitation originating from specific cameras which either admit interchange or no interchange of objective and furthermore the exposure calculating mechanism may be arranged in any selected position.

As herein described, use of the third embodiment of the invention offers considerable advantages, as it enables compensation for luminance differential originating from particular focussing screen used automatically completed in interlocking with the interchange operation of the focussing screen.

What is claimed is:
1. A single lens reflex camera, comprising
an objective lens,
an interchangeable focussing screen on which an image formed by the light rays passing through the maximum aperture of said objective is focussed,
an exposure meter circuit including a galvanometer, a photoelectric element positioned behind the focussing screen to measure the brightness of the image formed on the focussing screen used,
a variable resistor in the exposure meter circuit,
a signal abutment on each focussing screen positioned in dependence upon the characteristics of the specific focussing screen, and a compensatory mechanism linked to said variable resistor to compensate for variations introduced into the brightness measurement due to the light transmissive characteristics of the focussing screen used, said mechanism including a sensing member engaging said signal abutment to compensate the effective value of said resistor.

2. A single lens reflex camera according to claim 1, in which said compensatory mechanism further has a differential mechanism, said sensing member being connected to said variable resistor through said differential mechanism.

3. A single lens reflex camera according to claim 2, in which further at least two exposure value setting members are connected to said variable resistor through said differential mechanism.

4. A single lens reflex camera according to claim 2, in which said differential mechanism is a planetary gear mechanism and is connected to a stop setting ring of said objective.

References Cited

UNITED STATES PATENTS

| 3,264,964 | 8/1966 | Ebertz | 95—42 |
| 3,163,097 | 12/1964 | Zenyoji et al. | 95—42 XR |
| 3,174,417 | 3/1965 | Sauer et al. | 95—49 |

FOREIGN PATENTS 899,429　12/1953　Germany.

NORTON ANSHER, Primary Examiner

FRED L. BRAUN, Assistant Examiner

U.S. Cl. X.R.

356—219